Jan. 6, 1959 E. A. RICKLICK 2,867,452
UNIVERSAL HITCH ASSEMBLY
Filed March 19, 1956
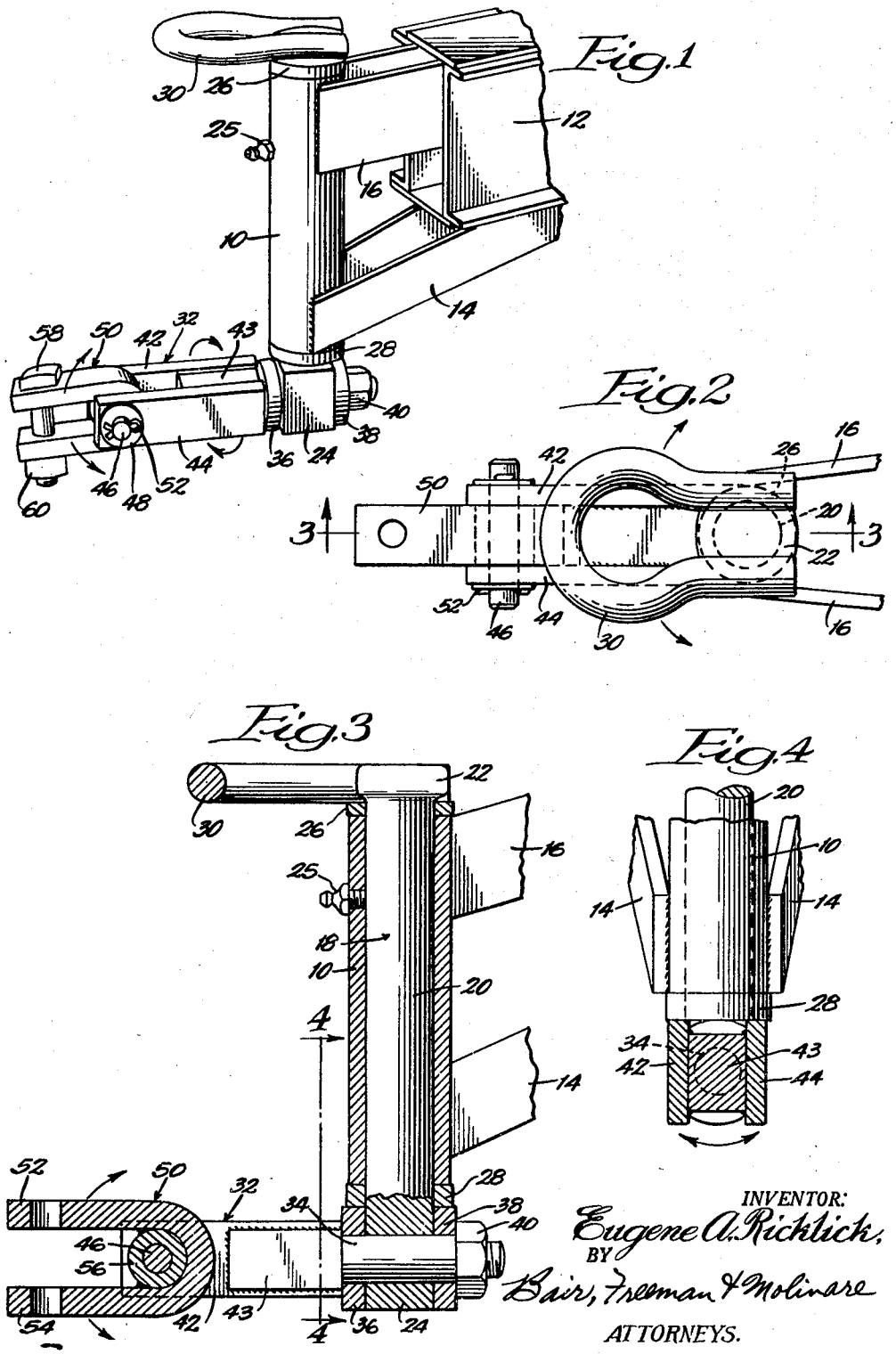

:::: {.patent-header}
United States Patent Office

2,867,452
Patented Jan. 6, 1959
::::

2,867,452

UNIVERSAL HITCH ASSEMBLY

Eugene A. Ricklick, Minneapolis, Minn., assignor to Stockland Road Machinery Company, Minneapolis, Minn., a corporation of Minnesota Application March 19, 1956, Serial No. 572,427

2 Claims. (Cl. 280—492)

This invention relates in general to vehicle coupling devices and more particularly to hitches for trailer units of the type adapted to be drawn by tractors, trucks, and the like.

Heretofore, the problem of obtaining smooth and reliable tracking by a trailer unit when drawn by a prime mover over terrain of rapidly changing contour has been without a fully satisfactory solution.

For example, considerable trouble has been experienced with prior art hitches due to the tendency of the vehicles to cramp as they pass over relatively steep holes and ditches in the ground. Further, the turning radius of the vehicles frequently has been restricted by bind between the prime mover drawbar and the hitch. Manifestly, these undesirable conditions have created the ever present possibility of damage to the vehicles as well as the hitch itself. In fact, it has not been an uncommon occurrence for a hitch to bind and break during short turns.

Much effort has been expended in the prior art to produce hitches capable of preventing the above described difficulties. As a result, hitches have been provided with single and even double pivotable and rotatable members for coupling but two degrees of movement have proved to be inadequate for the great variety of demands placed upon the hitch by draft vehicles such as two wheel grader units and the like. Further, prior art hitches, in general, have not been adapted for use with all of the large number of types of prime movers in use today, such prime movers ranging from small agricultural type tractors, through industrial crawler units and up to heavy four-wheeled drive trucks.

Accordingly, it is an object of this invention to provide an improved hitch assembly.

It is another object of this invention to provide an improved hitch assembly having at least three degrees of free movement relative to the prime mover and trailer unit.

It is still another object of this invention to provide an improved hitch assembly which not only eliminates binding and pinching due to sharp irregularities in horizontal contour but in addition provides a greatly increased turning radius limited only by interference between the vehicles themselves.

It is a further object of this invention to provide an improved hitch assembly adapted for connection to a great variety of prime movers having coupling means including fixed drawbars, swivel hitches, and pintle hook hitches.

These and other objects are realized in a specific illustrative embodiment of the invention wherein the entire hitch structure is swiveled within a tubular member rigidly affixed to the trailer unit. This feature eliminates the hitch as a binding factor with respect to turning radius. At one end of the hitch structure is secured a ring member for highway truck adaption. A block member is formed at the other end of the hitch structure and has an aperture which serves as a bearing for a first clevis member rotatably journaled therewithin. The latter provides a second degree of movement and is adapted for connection to swivel hitches such as are found in many types of agricultural tractors. A second clevis member is connected to the first clevis member so as to provide a third degree of free movement. This feature not only further eliminates binding and pinching but additionally enables connection to fixed drawbars such as are found in still other types of crawler or agricultural tractors.

The above and other features of novelty which characterize the invention are pointed out with particularity in the claims annexed to and forming a part of this specification. For a better understanding of the invention, however, its advantages and the specific objects attained with its use, reference is had to the accompanying drawing and descriptive matter in which is shown and described an illustrative embodiment of the invention.

In the drawing:

Figure 1 is a perspective view of one embodiment of the universal hitch assembly in accordance with the invention;

Figure 2 is a plan view of the universal hitch assembly;

Figure 3 is a cross section view taken on line 3—3 of Figure 2; and

Figure 4 is a fragmentary end view taken on line 4—4 of Figure 3.

Referring now to the drawing the specific illustrative embodiment of the invention shown therein is a universal hitch assembly such as advantageously may be utilized with a trailer unit of the road grader type. The hitch assembly comprises an elongated tubular member 10 which is supported in a fixed vertical position with respect to grader 12. To insure rigid and strong attachment thereto, it is preferred that tubular member 10 be welded to a plurality of angularly related grader drawbar arms 14 and 16 extending from the front portion of the grader.

A swivel member 18 is rotatably supported within tubular member 10. Swivel member 18 is formed of a main cylindrical portion 20 substantially coextensive with tubular member 10, a flange 22 expanding outwardly from cylindrical portion 20 and disposed at the upper end thereof, and a block shaped member 24 disposed at the lower end thereof. The diameter of cylindrical portion 20 is chosen so that swivel member 18 is in close fitting yet freely sliding relation with the inside circumference of tubular member 10. Free rotating movement of swivel member 18 about its longitudinal vertical axis may be facilitated, if desired, by means of a lubricant which may be applied to the swivel member through a grease receiving fitting 25 provided in tubular member 10. Advantageously, thrust bearing 26 is provided between flange 22 and tubular member 10, and thrust bearing 28 is provided between block shaped member 24 and tubular member 10 for enhancing the free rotating movement of swivel member 18 in tubular member 10.

Flange 22 serves a dual function in the instant embodiment. It cooperates with block shaped member 24 to maintain the swivel member 18 in proper rotating position with respect to tubular member 10 and it further serves as a support for a keyhole shaped ring 30 which is adapted for coupling the grader to the pintle hook hitches commonly utilized in highway trucks and the like. In accordance with the invention top ring 30 is securely attached in fixed position to the flange 26, such as by welding, to form an assembly capable of providing movement in a plurality of planes. Thus, the grader is capable of rotation in a horizontal plane relative to the hitch assembly and the truck or towing vehicle is capable of movement in both a vertical and horizontal plane relative to the hitch assembly.

The block shaped member 24 at the lower end of swivel member 18 may be integrally formed therewith, or if desired, may be securely attached thereto. Block member 24 has a shaped opening extending therethrough, the axis of which is transverse to the longitudinal axis of rotatable swivel member 18. Swivel means, indicated generally as 32, has at one end thereof an elongated cylindrical spindle or rod 34 adapted to be journaled within the shaped opening in block member 24 for rotation about the horizontal axis of the latter. Such rotation is facilitated by a pair of thrust bearings 36 and 38 positioned on portions of rod 34 which extend from each end of block member 24. Advantageously the end of rod 34 is threaded to accommodate lock nut 40 adapted for maintaining clevis means 32 in position relative to block member 24.

The other end of clevis means 32 comprises a pair of arms 42 and 44 disposed on a support 43 attached to rod 34 in substantially U-shaped fashion. Each arm has an aperture therein adapted to receive a cross pin 46. It will be appreciated that cross pin 46 may be secured in place relative to arms 42 and 44 by any suitable means, such as washers 48 and cotter pins 52', respectively. Clevis means 32 is adapted for coupling grader 12 to swivel hitches of the type commonly utilized in a number of present day agricultural tractors. Thus the grader is capable of rotary movement relative to the tractor in a horizontal plane about the vertical axis of swivel member 18 and in addition rotary movement in a vertical plane about the horizontal axis of clevis means 32.

It is another aspect of the universal hitch assembly that an additional clevis means 50 may be pivotally attached to clevis means 32 for coupling the grader to tractors of the type having a fixed drawbar at the end thereof. Clevis means 50 is substantially U-shaped and comprises a pair of arms 52 and 54. Advantageously a spacer sleeve 56 is securely attached, as by welding, to the inner circumferential surface between arms 52 and 54 for enabling clevis means 50 to be freely pivoted about cross pin 46 of clevis means 32. An aperture is provided in each of arms 52 and 54 for receiving a bolt 58 which may be secured thereto by a nut 60. The bolt and nut thus enables the grader to be coupled to a tractor drawbar in such a manner that at least three separate degrees of movement of the grader with respect to the tractor may be achieved. Thus the grader may be swiveled about the vertical axis of swivel member 18, rotated about the horizontal axis of rod 34, and pivoted about the axis of cross pin 46.

It will be apparent to the skilled in the art that the universal hitch assembly described above not only is adapted for coupling a trailer unit to any of a large variety of towing vehicles, such as tractors, trucks, and the like, but additionally provides a number of degrees of free movement such that cramping, binding and pinching between the vehicles is substantially eliminated despite sharp variations and irregularities in the contour of the terrain over which the vehicles may be used.

These advantages are attained, in part, through the substantially unlimited turning ability of the hitch provided by connecting the clevis and hook ring members to a central rod swiveled within a tube vertically affixed to the trailer unit, thereby providing a substantial improvement over prior art hitches in which the clevises of the hooks themselves were relied upon to accommodate side turning actions. As stated heretofore, such prior art hitches not only limited turning to an undesirable degree but were subject to binding and breaking during short turns. With the universal hitch assembly disclosed hereinabove, the turning radius is limited only by interference between the tractor wheel and the grader frame.

Those skilled in the art will understand that changes may be made in the construction and arrangement of the parts of the novel universal hitch assembly without departing from the real spirit and purpose of the invention, and it is intended that the appended claims cover any modified forms of structure or use of equivalents which reasonably may be included within their scope.

What is claimed is:

1. A universal hitch assembly for securing a trailer unit to a towing vehicle comprising an elongated tubular housing adapted to be secured in fixed vertical position to the trailer unit, a rod journaled in said tubular housing for rotation about its longitudinal vertical axis therewithin, one end of said rod extending beyond one end of said tubular housing and having a flange for supportingly mounting said rod in said housing, the other end of said rod extending beyond the other end of said tubular housing and having a transverse bore formed therein, first clevis means comprising a fork having a rotatable spindle attached to one end thereof, said spindle being rotatably positioned in the transverse bore of said rod so as to provide unrestricted rotation of said spindle about its longitudinal, horizontal axis within said bore, a cross pin attached to said fork, and second clevis means pivotally supported by said cross pin for rotation about an axis transverse to the longitudinal axis of the spindle of said first clevis means.

2. A universal hitch assembly in accordance with claim 1, further comprising a ring member secured to the flange at said one end of the rod and defining an opening for receiving a hook of the towing vehicle.

References Cited in the file of this patent

UNITED STATES PATENTS

| | | |
|---|---|---|
| 1,462,921 | Reichmann | July 24, 1923 |
| 1,990,328 | Jett | Feb. 5, 1935 |
| 2,057,658 | Bryant | Oct. 20, 1936 |
| 2,142,365 | McKee | Jan. 3, 1939 |
| 2,187,970 | Greer | Jan. 23, 1940 |
| 2,457,885 | Gatch | Jan. 4, 1949 |

FOREIGN PATENTS

| | | |
|---|---|---|
| 151,151 | Australia | Apr. 28, 1953 |